Oct. 15, 1929.    E. E. JOHNSON    1,731,928
CONSTANT LIQUID LEVEL APPARATUS
Filed Oct. 31, 1927    3 Sheets-Sheet 2
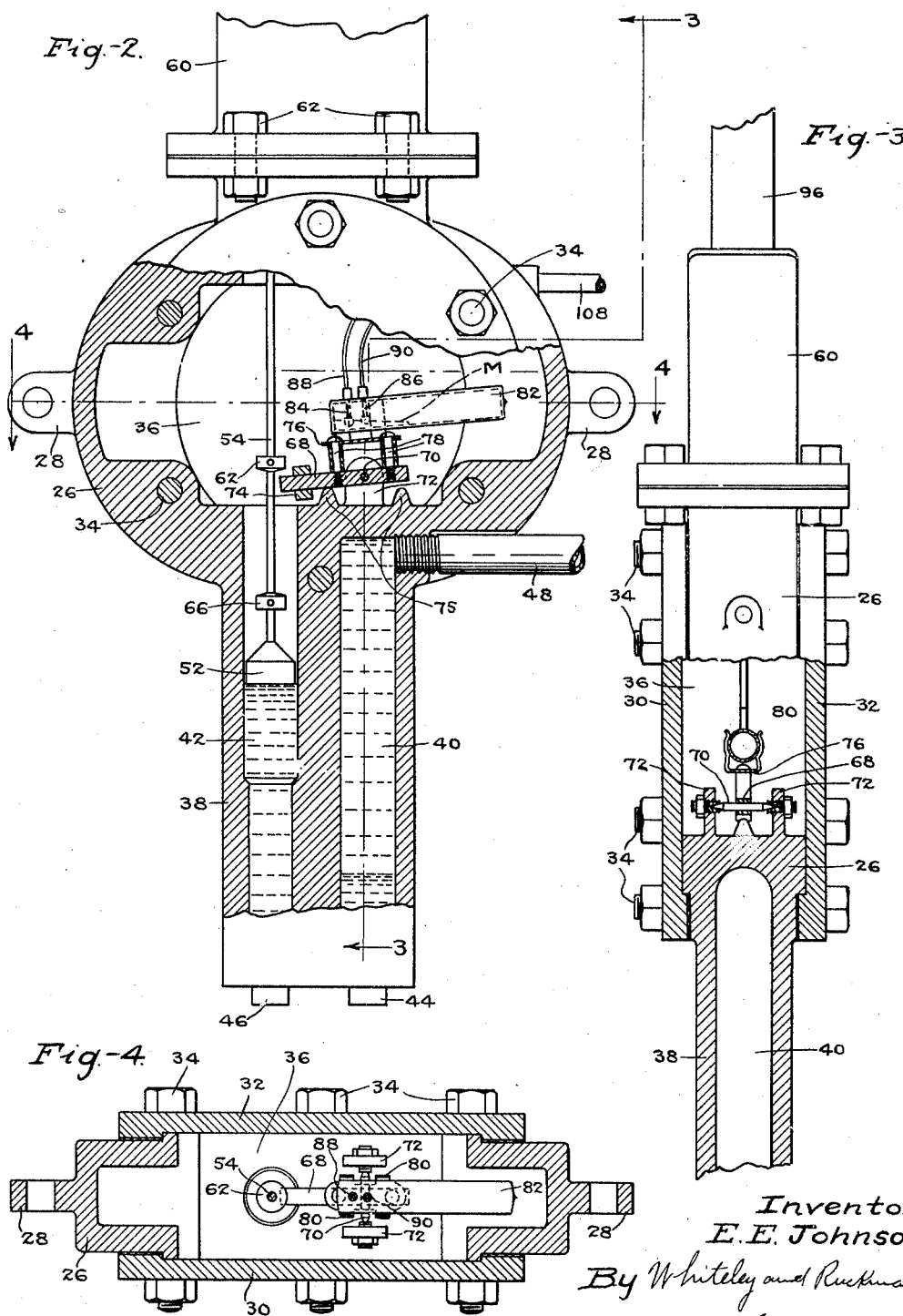

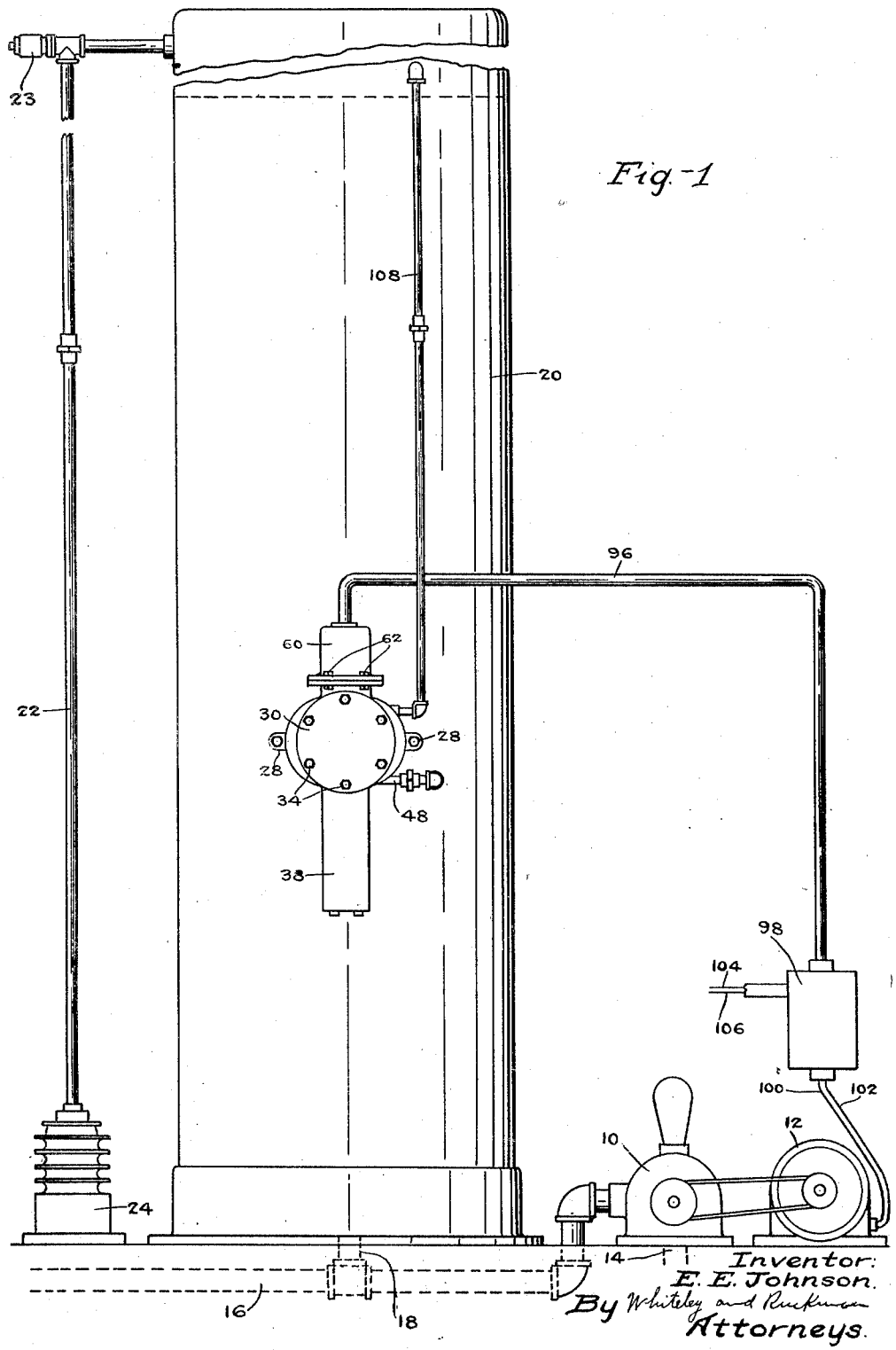

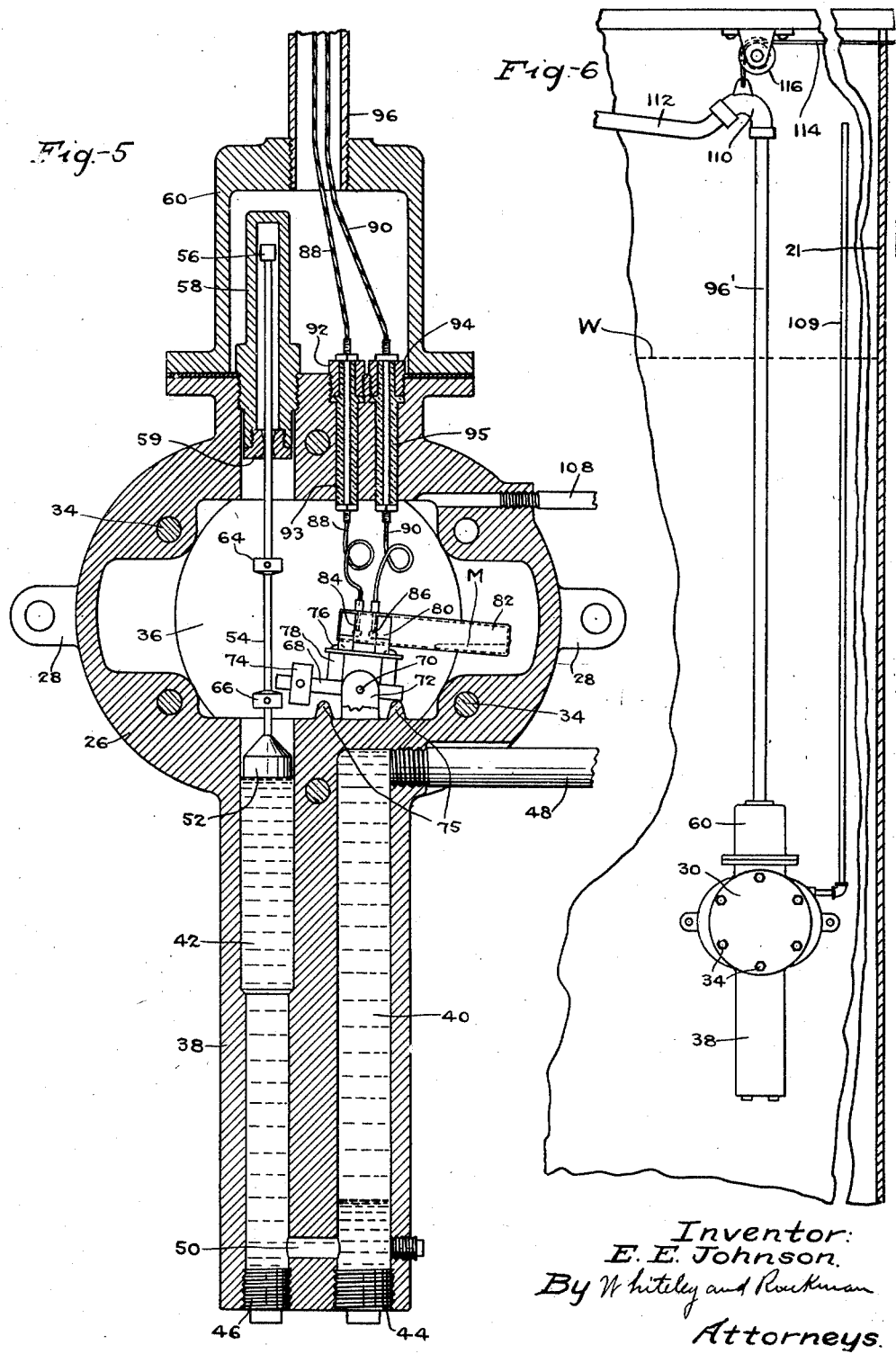

Patented Oct. 15, 1929

1,731,928

UNITED STATES PATENT OFFICE

EDWARD E. JOHNSON, OF ST. PAUL, MINNESOTA

CONSTANT-LIQUID-LEVEL APPARATUS

Application filed October 31, 1927. Serial No. 230,072.

My invention relates to apparatus for maintaining a substantially constant level of liquid in storage tanks either open or compression type. This invention is in the nature of an improvement on the apparatus disclosed and claimed in my prior application Serial Number 30,514, filed May 15, 1925. While obviously adapted for use with other liquids, it relates more particularly to devices for use in connection with water tanks of water supply systems. In the device disclosed in the application above referred to, a comparatively large quantity of mercury is required to counter-balance the head of the liquid. A particular object of the present invention is to provide a much shorter column of mercury which shall be effective to control the level of liquid in the tank. I accomplish this object by placing the column of mercury adjacent the tank at some distance above the bottom thereof, so that the mercury does not have to counterbalance the entire head of liquid in the tank. Another object is to provide a float supported by the mercury column having connections with a motor for starting the pumping operation when the liquid in the tank falls below a predetermined level and for stopping the pumping operation when the liquid in the tank rises to a predetermined level. Another object is to provide means whereby a counterbalanced device such as provided by the column of mercury will be constantly maintained under the same pressure of air as is the liquid in the tank in order that the apparatus may respond to changes in the level of the liquid irrespective of the air pressure maintained within the tank.

The full objects and advantages of my invention will appear in connection with the detailed description thereof, and the novel features of my inventive idea will be more particularly pointed out in the claims.

In the accompanying drawings which illustrate the invention in two slightly different forms,—

Fig. 1 is an elevational view showing the invention in use with a compression tank. Fig. 2 is a view of the device on an enlarged scale and in vertical section with the float in lowered position. Fig. 3 is a view in section on the line 3—3 of Fig. 2. Fig. 4 is a view in section on the line 4—4 of Fig. 2. Fig. 5 is a view similar to Fig. 2 showing the float in raised position. Fig. 6 is an elevational view of the device suspended in an open tank.

In the embodiment of the invention chosen for illustrative purposes, and referring more particularly to Fig. 1, a pump 10 driven by a motor 12 draws liquid such as water from a suitable source of supply through a pipe 14 and delivers it to a pipe 16 leading to any suitable distributing system. A pipe 18 connects the pipe 16 to a storage tank 20. The upper portion of this tank may, if desired, be connected by a pipe 22 with a suitable source of compressed air such as an air compressor 24 and provided with an air relief valve 23. Secured to the tank 20 at some distance above the bottom thereof, there is a casing which includes a hollow body member 26 having ears 28 for attaching it to the outside of the tank in the form shown in Fig. 1. The faces of the body member are provided with front and rear plates 30 and 32 secured thereto by bolts 34 in such manner as to provide a watertight and airtight chamber 36, as will be best understood from Fig. 4. The body member 26 has a downward extension 38 which is provided with two wells 40 and 42 closed at the bottom by screw plugs 44 and 46. The well 40 is closed at the top and near its upper end is connected by a pipe 48 with the interior of the tank 20. The wells 40 and 42 are connected at the bottom by a passageway 50. The wells 40 and 42 contain mercury to about half their depth until by pressure applied through pipe 48 the mercury is depressed in well 40 and raised in 42 to counterbalance it. The well 42 at its top is opened into the chamber 36 so as to freely receive a float 52 which is provided with an upwardly extending stem 54, the upper end of which is provided with stop collar 56 working freely in a tubular cap 58 secured airtight to member 26. Cap 58 is provided at its lower end with a guide 59 through which stem 54 reciprocates. The chamber in tubular cap 58 is long enough to accommodate the travel required by the stem 54 and the stop collar 56 provides a convenient means of keeping the parts in proper relation during the assembly of the device and prevents the float and stem from dropping down into well 42 before the mercury is put in and while collars 64 and 66 are being adjusted. The upper end of the tubular cap 58 extends up into a cap 60 secured water-tight on the member 26 by bolts 62. Two collars 64 and 66 are adjustably secured to the stem 54 in spaced relation to each other for operating a tiltable base member 68 mounted on a pivot pin 70 carried by ears 72 attached to the member 26. The tiltable member 68 is provided with an adjustable counterbalancing weight 74 and the tilting movement of the member 68 is limited by stop lugs 75. A strip 76 is supported above the tiltable base 68 by posts 78, and this strip has upwardly extending clips 80 which hold a tube 82 for providing a mercury switch, there being a small amount of mercury in the tube 82 indicated by the dotted line M. This tube near one end thereof, and at a place above the pivot 70, is provided with two contact points 84 and 86 with which the mercury in the tube is in contact to close the switch when the tube is in the position shown in Fig. 2. When the tube is in the position shown in Fig. 5, the mercury runs into the outer end of the tube so that the switch is open. Connected with the contact points 84 and 86 there are wires 88 and 90, respectively, which are embedded in insulating members 93 and 95 secured tightly in member 26 by plugs 92 and 94 and extend up through the cap 60. These wires continue on through a pipe 96 secured at one end to the cap 60 and secured at the other end of an automatic starting device 98 of well known construction from which wires 100 and 102 connect with the motor 12. This device is provided with feed wires 104 and 106 connected with any suitable source of electricity. A pipe 108 connects the upper end of the compression tank 20 with chamber 36 so that the pressure of the air in this chamber and in the top of the tank is equalized. The form shown in Fig. 6 differs from that already described in the fact that the casing and enclosed mechanism are supported within an open tank 21 and chamber 36 is in communication with the atmosphere through pipe 109 or in practice as the volume of chamber 36 is so little changed by variations in the mercury level in well 42, the pipe 109 may be discarded and the opening plugged. In this form, the wires 88 and 90, connected with the contact points, extend through a tube 96' which at its upper end is connected by an elbow 110 with a flexible tube 112 through which the wires continue so as to be connected in the manner previously described. A rope 114 runs over a pulley 116 and is attached to elbow 110 so that the device may be suspended in the water to the proper submergence required for its operation; by this means also adjustment of the water level to be maintained in the tank is obtained. Submerging the device below the water level W will prevent the water in the device from freezing in the wintertime when the tank has an exposed position. In this form of the invention, the pipe connection 48 previously described is dispensed with, the water being free to enter well 40 directly.

The operative characteristics and advantages of my invention will now be described. If the level of the water in the tank falls so that there is not sufficient pressure to maintain the mercury column and the float 52 in the position shown in Fig. 5 the float gradually lowers so that the collar 64 comes into engagement with member 68 and tilts it, thereby causing the mercury to complete the circuit between the contact points 84 and 86. While the downward travel of the float may be very slow its impelling force consisting of the weight of the stem and float is constant and so long as the mercury recedes due to the lessened water pressure on it there is ample power to operate the mechanism. It will be seen that when member 68 tilts it is free to move forward and away from collar 64. Considering the upward movement of the float 52: this is caused by the pump whose motor current-supply is to be cut off at a determined level by the tilting of tube 82. This break ought to be made quickly and with certainty in spite of the very slow motion of the float. Member 68 is therefore left free to travel forward and away from collar 66, when impelled by the mercury in tube 82. It will be seen that the mercury contact tube 82 is placed an appreciable distance above its supporting pivot 70 and also that it is considerably off center for reasons that will now be explained.

It is necessary that the tilting mechanism attached to member 68 be in stable equilibrium in either position as in Fig. 2 or Fig. 5. This is effected by elevating the mercury tube 82 above the pivot 70 so that its inner end moves through a considerable distance of arc and when the mercury lies as shown in Fig. 2 its center of gravity is at the left of the pivot 70 thus stabilizing the mechanism. When now the tilting mechanism is put into unstable equilibrium by the force of the rising float 52 acting on tiltable member 68 the center of gravity of the mercury shifts to zero and then across to the right of the pivot 70 thus stabilizing the tilting mechanism in the position of Fig. 5. It will be seen that the leverage of the mercury about the pivot is greatest in this position. This is important as it secures a prompt and effective breaking of the connection between the points 84 and 86 thus stopping the pump without danger of its being started again through slight oscillations of the mercury. The provision of the pipe connection 108 between the top of the compression tank 20 and the chamber 36 insures that the mercury in the well 42 shall always be under the same pressure of air as the liquid in the tank, and this pressure may be varied without affecting the operation of my device in any way, it being operated through the medium of the hydrostatic head of the liquid in the tank above my device and entirely independent of the air pressure in the tank.

I claim:

1. In an apparatus for maintaining a substantially constant level of liquid in tanks, the combination of a storage tank, a pump for supplying liquid to said tank, a motor for driving said pump, a casing enclosing a column of mercury supported adjacent said tank at a place above the bottom thereof, fluid connections with said casing whereby said mercury column is subjected to the pressure on the liquid which is being pumped, and power control connections set in operation by changes in the height of said mercury column for starting said motor when the liquid in said tank falls below a predetermined level and for stopping said motor when the liquid in said tank rises to a predetermined level.

2. In an apparatus for maintaining a substantially constant level of liquid in tanks, the combination of a storage tank, a pump for supplying liquid to said tank, an electric motor for driving said pump, a casing enclosing a column of mercury supported adjacent said tank at a place above the bottom thereof, fluid connections with said casing whereby said mercury column is subjected to the pressure on the liquid which is being pumped, and power control connections set in operation by changes in the height of said mercury column for causing current to be supplied to said motor when the liquid in said tank falls below a predetermined level and for causing current to be cut off from said motor when the liquid in said tank rises to a predetermined level.

3. In an apparatus for maintaining a substantially constant level of liquid in tanks, the combination of a storage tank, a pump for supplying liquid to said tank, a motor for driving said pump, a casing enclosing a column of mercury, fluid connections with said casing whereby said mercury column is subjected to the pressure on the liquid which is being pumped, a float supported by said mercury column, and power control connections between said float and said motor for starting said motor when the liquid in said tank falls below a predetermined level, and for stopping said motor when the liquid in said tank rises to a predetermined level.

4. In an apparatus for maintaining a substantially constant level of liquid in tanks, the combination of a storage tank, a pump for supplying liquid to said tank, an electric motor for driving said pump, a casing enclosing a column of mercury, fluid connections with said casing whereby said mercury column is subjected to the pressure on the liquid which is being pumped, a float supported by said mercury column, a switch operatively related to said motor, and connections between said float and said switch for closing said switch when the liquid in said tank falls below a predetermined level, and for opening said switch when the liquid in said tank rises to a predetermined level.

5. In an apparatus for maintaining a substantially constant level of liquid in tanks, the combination of a storage tank, a pump for supplying liquid to said tank, an electric motor for driving said pump, a casing enclosing a column of mercury supported adjacent said tank at a place above the bottom thereof, fluid connections with said casing whereby said mercury column is subjected to the pressure on the liquid which is being pumped, a float supported by said mercury column, a stem attached to said float, a tiltable mercury switch operatively related to said motor, and means carried by said stem for tilting said switch to cause current to be supplied to said motor when the liquid in said tank falls below a predetermined level, and to cause current to be cut off from said motor when the liquid in sand tank rises to a predetermined level.

6. In an apparatus for maintaining a substantially constant level of liquid in tanks, the combination of a storage tank having an effective head, a source of liquid supply connected with said tank, a device subjected to the pressure on the liquid in said tank and counterbalanced thereto, means controlled by the height of the counterbalanced medium for maintaining the level of the liquid in said tank between predetermined maximum and minimum levels, and a fluid connection between the top of said tank and said counterbalanced device whereby the latter and the liquid in the tank are maintained under the same pressure of air.

7. In an apparatus for maintaining a substantially constant level of liquid in tanks, the combination of a storage tank having an effective head, a source of liquid supply connected with said tank, a casing containing mercury subjected to the pressure on the liquid in said tank and counterbalanced thereto, electrically operated means controlled by the height of mercury in said casing for maintaining the level of the liquid in said tank between predetermined maximum and minimum levels, and a fluid connection between the top of said tank and said casing whereby the latter and the liquid in said tank are maintained under the same pressure of air.

8. In an apparatus for maintaining a substantially constant level of liquid in tanks, the combination of a storage tank, means for supplying compressed air to said tank, a source of liquid supply connected with said tank, a device subjected to the pressure on the liquid in said tank and counterbalanced thereto, means controlled by the height of the counterbalanced medium for maintaining the level of the liquid in said tank between predetermined maximum and minimum levels, and a pipe connecting the top of said tank with said counterbalanced device whereby the latter and the liquid in said tank are maintained under the same pressure of air.

9. In an apparatus for maintaining a substantially constant level of liquids in tanks, the combination of a source of liquid supply, a storage tank having an effective head connected thereto, a device in communication therewith subjected to the pressure on the liquid in said tank and counterbalanced against action thereby, and means controlled by the hydrostatic head of the liquid in said tank for maintaining said liquid between predetermined maximum and minimum levels.

In testimony whereof I hereunto affix my signature.

EDWARD E. JOHNSON.